(12) United States Patent
Niekawa

(10) Patent No.: US 9,341,723 B2
(45) Date of Patent: May 17, 2016

(54) RADIOGRAPHIC IMAGE CAPTURING APPARATUS

(71) Applicant: Konica Minolta, Inc., Chiyoda-ku, Tokyo (JP)

(72) Inventor: Yukihiro Niekawa, Hachioji (JP)

(73) Assignee: KONICA MINOLTA, INC. (JP)

( * ) Notice: Subject to any disclaimer, the term of this patent is extended or adjusted under 35 U.S.C. 154(b) by 0 days.

(21) Appl. No.: 14/717,300

(22) Filed: May 20, 2015

(65) Prior Publication Data

US 2015/0338531 A1 Nov. 26, 2015

(30) Foreign Application Priority Data

May 22, 2014 (JP) .................... 2014-105793

(51) Int. Cl.
*G01T 1/24* (2006.01)
*H04N 5/32* (2006.01)
*H04N 5/369* (2011.01)
*H04N 5/365* (2011.01)

(52) U.S. Cl.
CPC ............... *G01T 1/247* (2013.01); *G01T 1/241* (2013.01); *H04N 5/32* (2013.01); *H04N 5/3658* (2013.01); *H04N 5/3698* (2013.01)

(58) Field of Classification Search
CPC ....... G01T 1/247; G01T 1/241; H04N 5/3698; H04N 5/32; H04N 5/3658
See application file for complete search history.

(56) References Cited

U.S. PATENT DOCUMENTS

| 7,514,690 | B2* | 4/2009 | Endo | H04N 5/32 250/208.1 |
|---|---|---|---|---|
| 2010/0088843 | A1* | 4/2010 | Reed | A47L 9/2857 15/389 |
| 2012/0013319 | A1* | 1/2012 | Patil | G11C 5/148 323/282 |

FOREIGN PATENT DOCUMENTS

JP 2010268171 A 11/2010

* cited by examiner

*Primary Examiner* — David Porta
*Assistant Examiner* — Mindy Vu
(74) *Attorney, Agent, or Firm* — Cantor Colburn LLP

(57) ABSTRACT

A radiographic image capturing apparatus includes: a readout IC equipped with a plurality of readout circuits connected to signal lines, respectively; a power source circuit which supplies a power to the readout IC; and a discharge circuit disposed on a path through which the power source circuit supplies the power to the readout IC, the discharge circuit being is capable of connecting the path and a GND to each other. The discharge circuit connects the path and the GND during a sleep mode.

5 Claims, 6 Drawing Sheets

RADIOGRAPHIC IMAGE CAPTURING APPARATUS

CROSS REFERENCE TO RELATED APPLICATIONS

The present invention claims priority under 35 U.S.C. §119 to Japanese Application No. 2014-105793 filed May 22, 2014, the entire content of which is incorporated herein by reference.

BACKGROUND OF THE INVENTION

1. Field of the Invention

The present invention relates to a radiographic image capturing apparatus, and especially to a radiographic image capturing apparatus including a plurality of radiation detecting elements two-dimensionally arranged.

2. Description of Related Art

Heretofore, various kinds of radiographic image capturing apparatuses have been developed, such as a so-called direct type radiographic image capturing apparatus which causes detecting elements to generate electric charges depending on a dose of irradiated radiation such as X-ray and converts the electric charges into electrical signals, and a so-called indirect type radiographic image capturing apparatus which causes a scintillator or the like to convert irradiated radiation into other wavelength light such as visible light and then causes photoelectric conversion elements such as photodiodes to generate electric charges depending on energy of converted and irradiated light and converts the electric charges into electrical signals (i.e. image data). With regard to the present invention, the detecting elements of the direct type radiographic image capturing apparatus and the photoelectric conversion elements of the indirect type radiographic image capturing apparatus are correctively referred to as radiation detecting elements.

The radiographic image capturing apparatus of this type has been known as a Flat Panel Detector (FPD), and has been heretofore configured as a so-called exclusive-machine type (also called as a fixed type, etc.) configured integrally with a support base. Recently, there has been developed and come into practical use a portable radiographic image capturing apparatus which houses the radiation detecting elements and the like in a housing so that those elements and the like become portable.

In such a radiographic image capturing apparatus, as illustrated in FIG. 3 to be mentioned later for example, generally a plurality of radiation detecting elements 7 are arranged in the state of a two-dimensional matrix on a detecting section P. When the radiographic image capturing apparatus is irradiated with radiation through a not-illustrated patient as an object at the time of imaging, the radiation detecting elements 7 generate the electric charges. To each of the radiation detecting elements 7, a switch element composed of a Thin Film Transistor (hereinafter referred to as a TFT) 8 and the like is connected. In a readout processing of image data D after the imaging, when the TFT 8 is turned on so that the electric charges accumulated in the radiation detecting elements 7 are discharged into signal lines 6, the electric charges flow into readout circuits 17 through the signal lines 6, and are read out as electric charge data D in the readout circuits 17. The readout processing of the image data D will be described later.

Meanwhile, in the case that imaging using the radiographic image capturing apparatus is not performed at least for a while, the power applied to respective functional sections such as the readout circuits 17 of the radiographic image capturing apparatus is wasted. Especially in the above-described portable radiographic image capturing apparatus including a battery, if the power is thus wasted, the battery would be consumed earlier, the number of time of the imaging on one battery charge would be reduced, and imaging efficiency would be reduced. Those have been problems.

For this reason, there have been not a little radiographic image capturing apparatuses configured to have an imaging mode including at least: a wake up mode in which the power is applied to the respective functional sections so that the imaging can be performed; and a sleep mode in which the power is applied to required minimum functional sections and the imaging cannot be performed, wherein the imaging mode can be switched between these modes (e.g. see Japanese Patent Application Laid-open No. 2010-268171). The above-described readout circuits 17 consume relatively large power at the time of the readout operation of the image data D and the like. For this reason, in the sleep mode, generally the radiographic image capturing apparatus does not perform at least the readout operations in the readout circuits 17.

In the meantime, according to the research by the inventor, it has been found that when the imaging is performed after the power mode of the radiographic image capturing apparatus 1 is switched to the sleep mode and then switched to the imagable mode again, sometimes image unevenness and/or stripe pattern appear, though only slightly, in a radiographic image I generated based on the image data D which has been read out after the imaging (see FIG. 7). In FIG. 7, the image unevenness and the stripe pattern appearing in the radiographic image I are emphatically illustrated.

As described later, generally a predetermined number (e.g. 128, 256, etc.) of the readout circuits 17 are provided in one readout IC 16 (see FIG. 3 to be mentioned later), and a necessary number of readout ICs 16 are arranged in parallel depending on the number of signal lines 6 or the like. According to the research of the inventor, as illustrated in FIG. 7, the image unevenness in the radiographic image I appears in each of regions R1, R2, R3, R4, ... corresponding to the readout ICs 16, respectively, and the strip pattern appears in positions corresponding to the readout circuits 17.

Concretely, the signal lines 6 are connected to the readout circuits 17, respectively, and the predetermined number of the signal lines 6 are connected to each of the readout ICs 16, as described above. When paying attention to each of regions R1, R2, R3, R4, ... in the radiographic image I corresponding to the respective readout ICs 16, a certain offset is superimposed on the image data D of pixels within each one of the regions R. The certain offset is different according to each of the readout ICs 16. The superimposed offset appears as the image unevenness in each of regions R1, R2, R3, R4, .... Additionally, it has also been found that offsets are superimposed on the image data D of pixels correspondingly to the signal lines 6 connected to the readout circuits 17, respectively, which offsets appear as the stripe pattern in the radiographic image I.

As a result of accumulation of research by the inventor, the cause of superimposition of the offset which causes image unevenness and/or stripe pattern on the image data D has been found, and also the configuration to prevent such a phenomenon from occurring has been found.

SUMMARY OF THE INVENTION

The present invention is made in view of the foregoing problems, and an object of the present invention is to provide a radiographic image capturing apparatus which can accurately prevent an offset causing image unevenness and/or stripe pattern from being superimposed on image data even when the power mode is switched from the sleep mode to the imagable mode and then an imaging is performed.

In order to achieve the above object, according to one aspect of a preferred embodiment of the present invention, there is provided a radiographic image capturing apparatus including: a plurality of radiation detecting elements arranged two-dimensionally; a plurality of signal lines each connected to each of the radiation detecting elements; a readout IC equipped with a plurality of readout circuits connected to the signal lines, respectively; a power source circuit which supplies a power to the readout IC; and a discharge circuit disposed on a path through which the power source circuit supplies the power to the readout IC, the discharge circuit being capable of connecting the path and a GND to each other, wherein the radiographic image capturing apparatus is configured so that an imaging mode can be switched at least between a wake up mode in which the power is supplied to at least one functional section so that an imaging can be performed, and a sleep mode in which the power is supplied to a required minimum functional section of the functional section and the imaging cannot be performed, and the discharge circuit connects the path and the GND to each other during the sleep mode.

According to the radiographic image capturing apparatus having such a system, the electric charges remaining in the power source circuit, readout IC and sensor panel can proactively flow out toward the GND and can be accurately removed via the discharge circuit during the sleep mode. Therefore, even when the power mode is subsequently switched from the sleep mode to the imagable mode and then the imaging is performed, the offsets due to the residual electric charges can be accurately prevented from being superimposed on the image data, and the image unevenness and/or stripe pattern can be accurately prevented from appearing in the radiographic image I generated based on the read-out image data and the like.

BRIEF DESCRIPTION OF THE DRAWINGS

The present invention will become more fully understood from the detailed description given hereinbelow and the appended drawings, and thus are not intended as a definition of the limits of the present invention, and wherein.

PREFERRED EMBODIMENT OF THE PRESENT INVENTION

Hereinafter embodiments of a radiographic image capturing apparatus according to the present invention will be described with reference to the drawings.

Incidentally, as a radiographic image capturing apparatus of the present invention, a so-called indirect type radiographic image capturing apparatus which is equipped with a scintillator or the like and converts irradiated radiation into other wavelength light such as visible light to obtain an electrical signal will hereinafter be described. However, the present invention can also be applied to a so-called direct type radiographic image capturing apparatus which directly detects radiation with radiation detecting elements without the scintillator or the like.

Moreover, a case that the radiographic image capturing apparatus is a so-called portable type will be described, but the present invention can be applied to a so-called exclusive-machine type radiographic image capturing apparatus integrally formed with a support base and the like.

[Basic Configuration]

Figure 1:
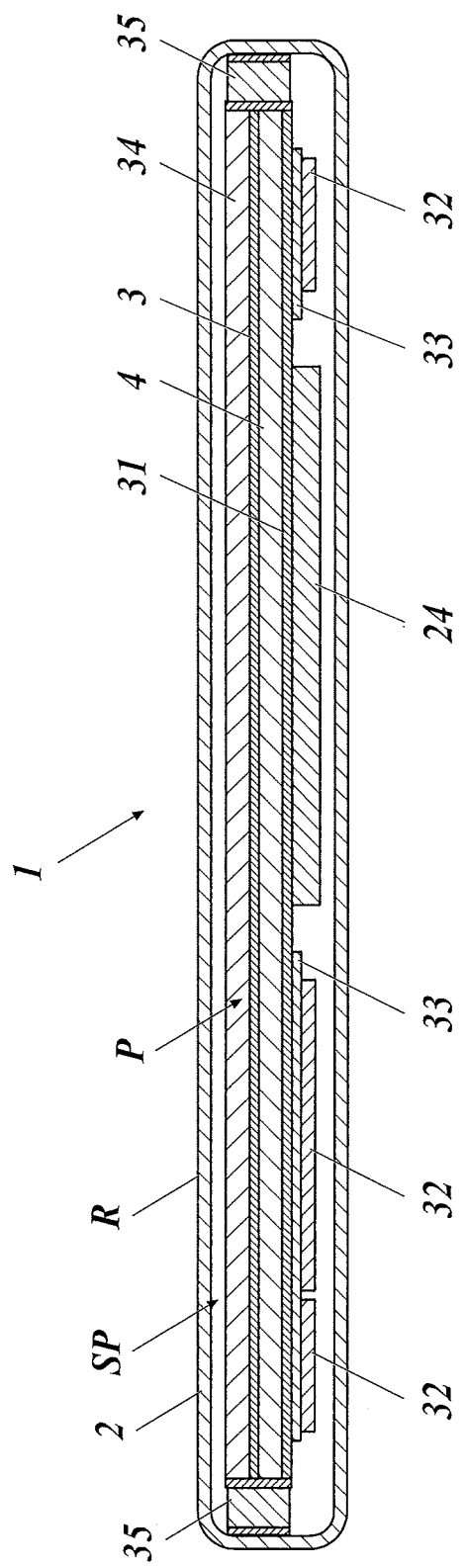
FIG. 1 is a cross-section view of a radiographic image capturing apparatus.
Figure 2:
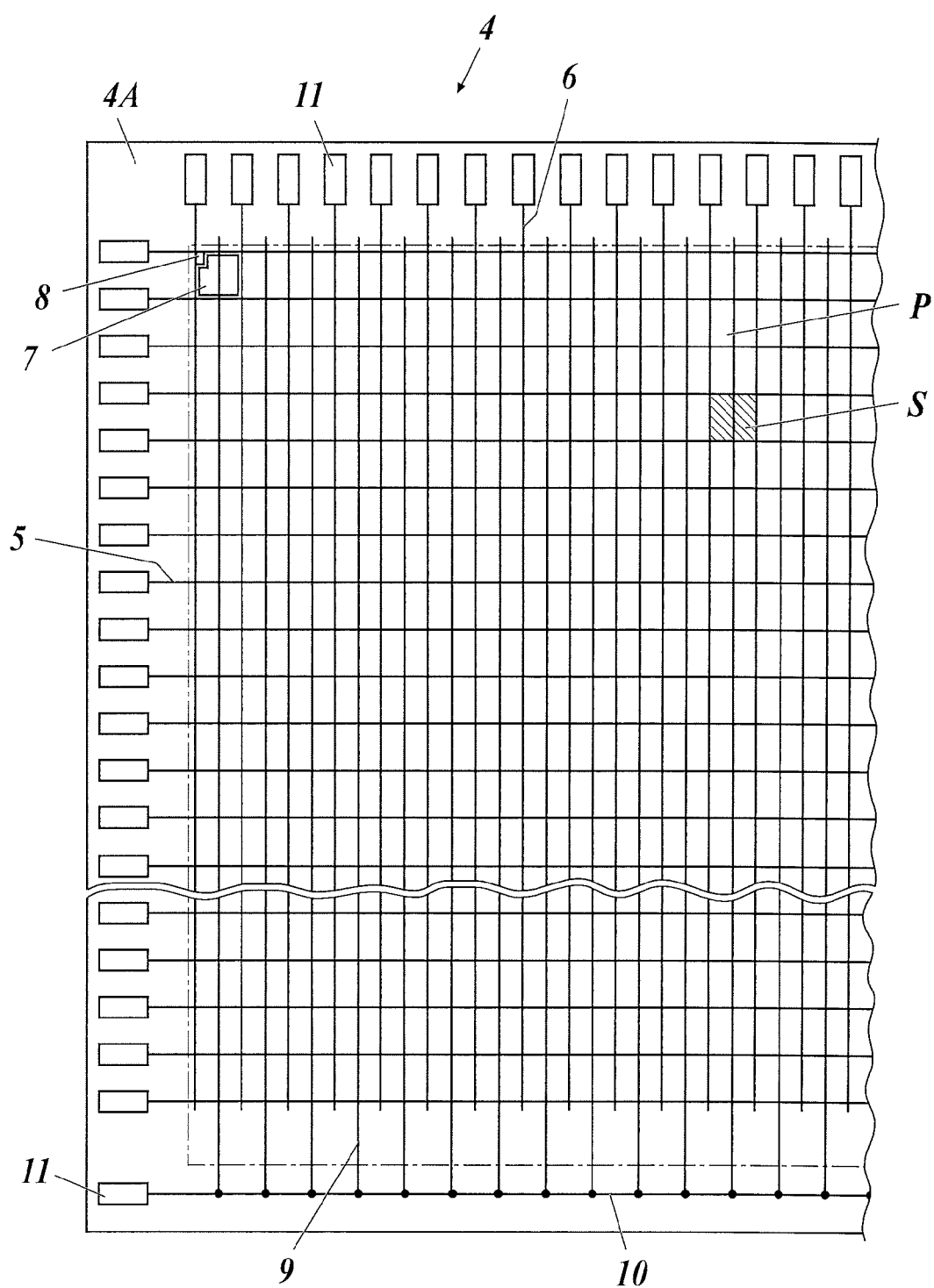
FIG. 2 is a plan view illustrating a configuration of a substrate of the radiographic image capturing apparatus.

First, a basic configuration and the like of the radiographic image capturing apparatus of this embodiment will be described. FIG. 1 is a cross-section view of the radiographic image capturing apparatus of the embodiment, and FIG. 2 is a plan view illustrating the configuration of the substrate of the radiographic image capturing apparatus.

In the embodiment, the radiographic image capturing apparatus 1 has a housing 2 including a radiation incident surface R on a radiation irradiation side, the housing 2 containing a sensor panel SP composed of a scintillator 3, a sensor substrate 4, etc. Although illustration is omitted in FIG. 1, an antenna 41 (see FIG. 3 to be mentioned later) for transmitting/receiving data, signals, etc. to/from external devices/apparatuses in a wireless system, and a connector for transmitting/receiving them in a wire system are provided on a side surface or the like of the housing 2.

As illustrated in FIG. 1, a base 31 is disposed in the housing 2, and the sensor substrate 4 is disposed on a radiation-incident-surface R side (hereinafter simply referred to as an upper-surface side, etc., in conformity to a vertical direction in the drawings) of the base 31 through a not-illustrated lead thin film or the like. Additionally, radiation detecting elements 7 and the like are disposed on the upper-surface side of the sensor substrate 4, and furthermore the scintillator 3 is disposed on them, the scintillator 3 converting the irradiated radiation into light such as visible light so as to emit the light to the radiation detecting elements 7. Incidentally, the scintillator 3 is attached to a scintillator substrate 34.

On a lower surface side of the base 31, there are disposed a PCB substrate 33 on which electronic components 32 and the like are arranged, a battery 24, and so on. The sensor panel SP is thus composed of the base 31, the sensor substrate 4, and so on. Furthermore, in the embodiment, a cushioning 35 is provided between the sensor panel SP and each of the sides of the housing 2.

The sensor substrate 4 of the embodiment is composed of a glass substrate, and as illustrated in FIG. 2, a plurality of scanning lines 5 and a plurality of signal lines 6 are arranged so as to cross each other on the upper surface 4A (i.e. the surface facing the scintillator 3) of the sensor substrate 4. In small areas S divided by the scanning lines 5 and the signal lines 6 on the surface 4A of the sensor substrate 4, the radiation detecting elements 7 are disposed, respectively.

The whole of the small areas S divided by the scanning lines 5 and signal lines 6 and including the radiation detecting elements 7 arranged in the state of a two-dimensional matrix, namely a region indicated with chain lines in FIG. 2, is defined as a detecting section P. In the embodiment, photodiodes are used as the radiation detecting elements 7, but, for example, also phototransistors or the like may be used.

Figure 3:
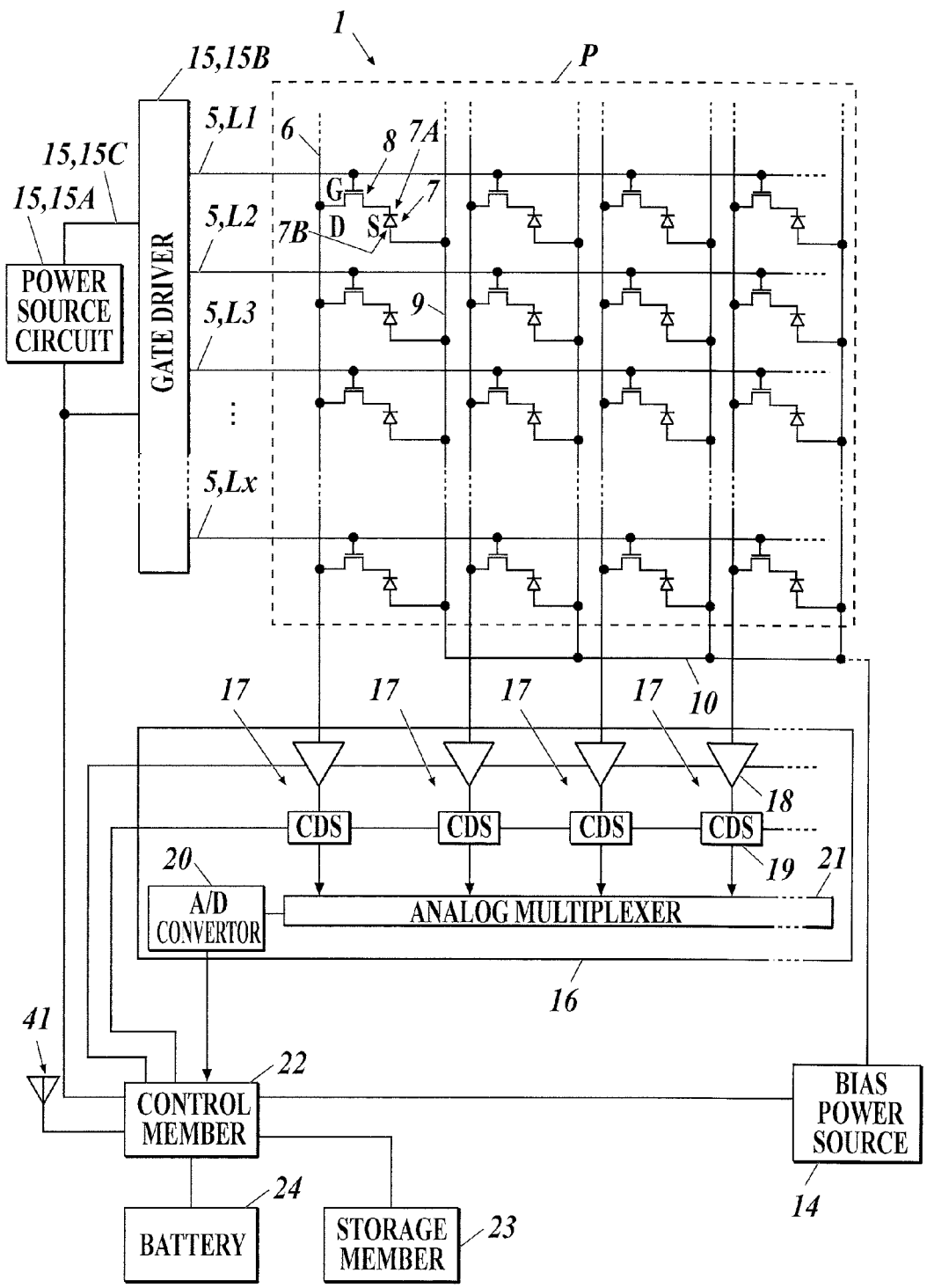
FIG. 3 is a block diagram illustrating an equivalent circuit of the radiographic image capturing apparatus.
Figure 4:
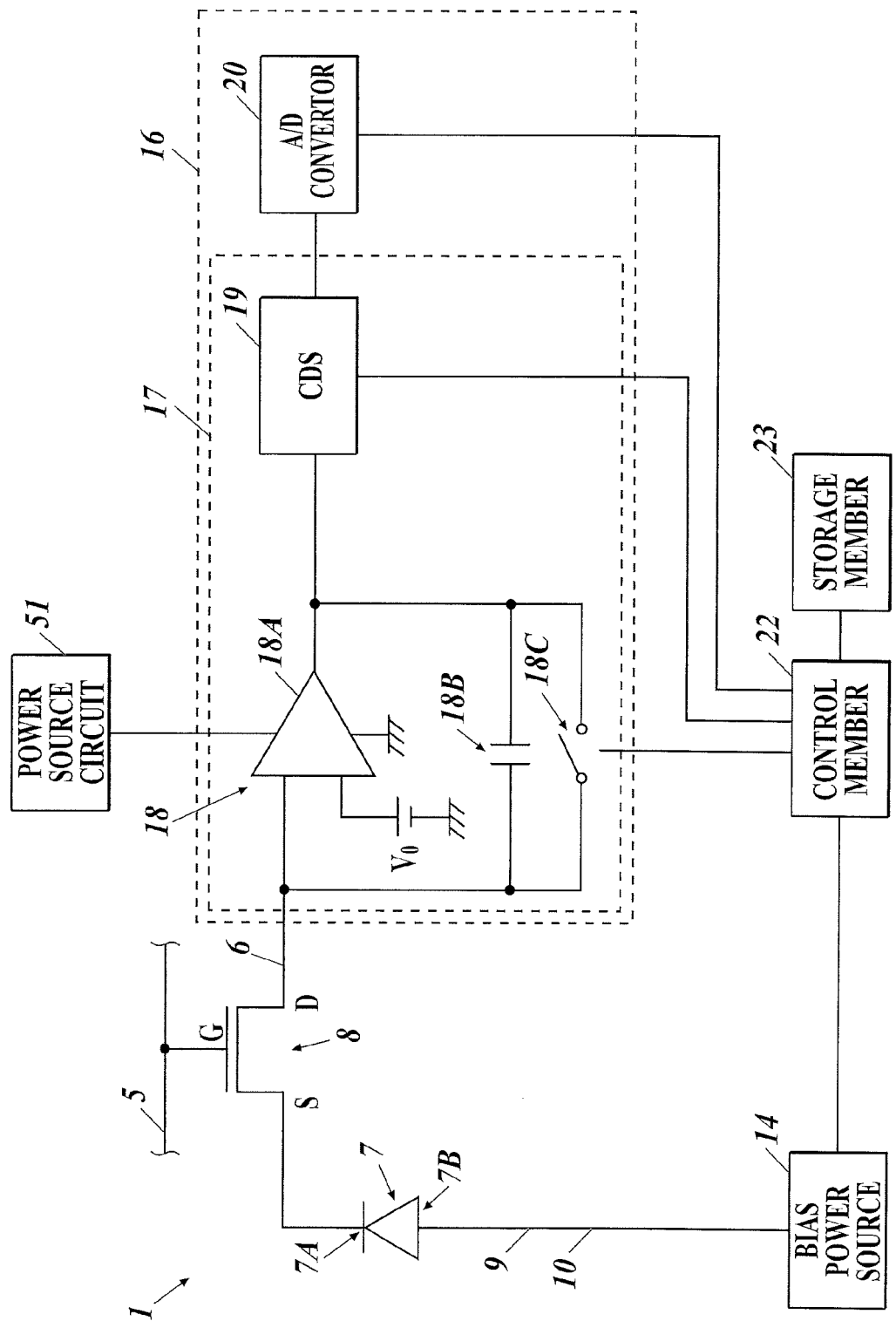
FIG. 4 is a block diagram illustrating an equivalent circuit for one pixel constituting a detecting section.

Here, a circuit configuration of the radiographic image capturing apparatus 1 will be described. FIG. 3 is a block diagram illustrating an equivalent circuit of the radiographic image capturing apparatus 1 of the embodiment, and FIG. 4 is a block diagram illustrating an equivalent circuit of one pixel constituting the detecting section P.

To a first electrode 7A of each of the radiation detecting elements 7, a source electrode 8S (see "S" in FIGS. 3 and 4) of the TFT 8 as the switch element is connected. A drain electrode 8D and a gate electrode 8G (see "D" and "G" in FIGS. 3 and 4) of the TFT 8 are connected to each of the signal lines 6 and each of the scanning lines, respectively.

The TFT 8 becomes on-state when an ON voltage is applied to the gate electrode 8G from a later-described scan driving member 15 via each of the scanning lines 5, and causes the electric charge accumulated in the radiation detecting member 7 to be discharged to each of the signal lines 6 via the source electrode 8S and the drain electrode 8D. The TFT 8 becomes off-state when an OFF voltage is applied to the gate electrode 8G via each of the scanning lines 5, and stops the discharge of the electric charge to each of the signal lines 6 from the radiation detecting member 7 so that the electric charge is accumulated in the radiation detecting element 7.

In the embodiment, as illustrated in FIGS. 2 and 3, a bias line 9 is provided for each column of the radiation detecting members 7 and connected to a second electrode 7B of each of the radiation detecting members 7. A plurality of bias lines 9 are connected to a tie line 10 at the outside of the detecting section P of the sensor substrate 4. The tie line 10 is connected to a bias power source 14 (see FIGS. 3 and 4) via an input/output terminal 11 (also referred to as a pad, etc.; see FIG. 2) so that a reverse bias voltage is applied to the second electrode 7B of each of the radiation detecting members 7 from the bias power source 14 via the tie line 10 and each of the bias lines 9.

Incidentally, in the embodiment, a not-illustrated flexible circuit substrate is connected to each of the input/output terminals 11, the flexible circuit substrate including a chip such as a later-described readout IC 16 and a gate IC constituting a gate driver 15B of the scan driving member 15, the chip being incorporated on a film. The scanning lines 5, the signal lines 6, and the tie line 10 of the bias lines 9 on the sensor substrate 4 are electrically connected to electronic components 32 and the like (see FIG. 1) disposed on the back side of the sensor panel SP via the flexible circuit substrate.

In the scan driving member 15, the ON and OFF voltages are supplied to the gate driver 15B from the power source circuit 15A via a wiring 15C. The voltage to be applied to each of lines L1 to Lx of the scanning lines 5 is switched between the ON voltage and the OFF voltage by the gate driver 15B.

Each of the signal lines 6 is connected to each of the readout circuits 17 contained in each of the readout ICs 16 via each of the input/output terminals 11. The readout circuit 17 of the embodiment is mainly composed of an amplifier circuit 18, a correlated double sampling circuit 19, etc. The readout IC 16 further includes an analog multiplexer 21 and an A/D convertor 20. In FIGS. 3 and 4, the correlated double sampling circuit 19 is written as "CDS".

The amplifier circuit 18 of the embodiment is composed of a charge amplifier circuit including an operational amplifier 18A, and a capacitor 18B and electric-charge reset switch 18C each of which is connected in parallel with respect to the operational amplifier 18A. To an inverted input terminal on an input side of the operational amplifier 18A of the amplifier circuit 18, each of the signal lines 6 is connected. The electric-charge reset switch 18C of the amplifier circuit 18 is connected to a control member 22, and controlled to be turned on/off by the control member 22. Incidentally, the power source circuit 51 supplies the power to the operational amplifier 18A and the like. This point will be described later.

At the time of the readout processing of the image data D from the radiation detecting elements 7 after imaging, when the TFTs 8 of the radiation detecting elements 7 become on-state while the electric-charge reset switch 18C of the amplifier circuit 18 in the readout circuit 17 is in the off state, the electric charges discharged from the radiation detecting elements 7 via the TFTs 8 pass though the signal lines 6 to flow into the capacitors 18B of the amplifier circuits 18, and thereby the electric charges are accumulated in the capacitors 18B. Then each of the amplifier circuits 18 outputs a voltage value depending on a quantity of the electric charge accumulated in the capacitor 18B from the output side.

The correlated double sampling circuit 19 retains the output values from the amplifier circuit 18 before and after the flow of the electric charges from the radiation detecting elements 7, and outputs a difference between these output values toward the downstream side as the image data D having an analog value. Then the output image data D is sequentially transmitted to the A/D convertor 20 via the analog multiplexer 21 (see FIG. 3), sequentially converted into the image data D having a digital value by the A/D convertor 20, and output to a storage member 23 and sequentially stored therein. Thus the readout processing of the image data D is performed.

The control member 22 is composed of a computer including a not-illustrated Central Processing Unit (CPU), Read Only Memory (ROM), Random Access Memory (RAM), input/output interface, etc. which are connected to a bus, and a Field Programmable Gate Array (FPGA), and so on. Alternatively, the control member 22 may be composed of a dedicated control circuit.

The control member 22 controls the operations of the respective functional sections of the radiographic image capturing apparatus 1, for example, controls the scan driving member 15 and/or the readout circuit 17 so that the readout processing of the image data D is performed as described above. As illustrated in FIGS. 3 and 4, the storage member 23 composed of a Static RAM (SRAM), Synchronous DRAM (SDRAM), or the like is connected to the control member 22. Moreover, to the control member 22 of the embodiment, the above-described antenna 41 is connected, and also the battery 24 which supplies the necessary power to the functional sections such as the scan driving member 15, readout circuit 17, storage member 23, bias power source 14, etc. is connected.

In the embodiment, the radiographic image capturing apparatus 1 is configured so that the imaging mode can be switched at least between a wake up mode in which the power is supplied to the functional sections such as the control member 22 so that imaging can be performed, and a sleep mode in which the power is applied to required minimum functional sections and the imaging cannot be performed.

At that time, the readout circuit 17 consumes relatively large power at the time of the readout operation of the image data D and the like as described above. Accordingly, though the sleep mode can take various forms, at least the readout operation by the readout circuit 17 is not performed in the sleep mode of the embodiment.

[Configuration and the Like Specific to the Present Invention]

Next, the configuration specific to the present invention in the radiographic image capturing apparatus 1 of the embodiment will be described.

Figure 7:
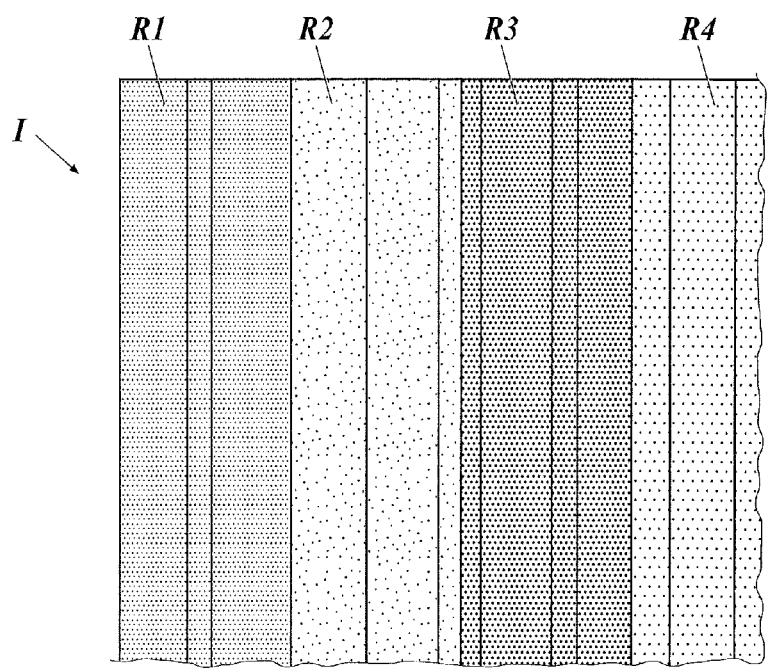
FIG. 7 is a diagram for explaining about image unevenness and/or stripe pattern appearing in a generated radiographic image.

As described above, when the imaging is performed after the power mode of the radiographic image capturing apparatus 1 is switched from the sleep mode to the imagable mode, some offset is superimposed on the image data D which has been read out after the imaging, and sometimes image unevenness and/or stripe pattern appear, though only slightly, in the radiographic image generated based on the image data D (e.g. see FIG. 7).

The inventor has been doing the research about the cause of such a phenomenon, and the following things have come to light. Even when the imaging is performed by the radiographic image capturing apparatus 1 in the imagable mode, and after the imaging, the power mode of the radiographic image capturing apparatus 1 is switched to the sleep mode so that the radiographic image capturing apparatus 1 becomes power-saving state, the electric charges in the functional sections of the radiographic image capturing apparatus 1 are not removed immediately, because the electric charges remain in portions, for example, where parasitic capacitance is formed, the portions being, for example, on the side of the detecting section P (see FIG. 3) including the radiation detecting elements 7, scanning lines 5 and signal lines 6, on the side of the readout IC 16, and/or on the side of the after-described power source circuit 51 (see FIGS. 5A and 5B to be mentioned later) which supplies the power to the readout IC 16 and the like.

Because a removal efficiency of the residual electric charge is different according to each of the readout ICs 16, the value of the offset to be superimposed on the image data D, the offset being due to the residual electric charge, becomes different according to each of the readout ICs 16. Such an offset appears as the image unevenness in each of regions R1, R2, R3, R4, . . . of the radiographic image I, the regions corresponding to the readout ICs 16, respectively. Moreover, because the removal efficiency of the residual electric charge is also different according to each of the readout circuits 17, the value of the offset to be superimposed on the image data D, the offset being due to the residual electric charge, becomes different according to each of the readout circuits 17. This seems the reason why the stripe patterns corresponding to the readout circuits 17 appear in the radiographic image I.

Consequently, the present invention adopts the configuration where a discharge circuit is provided on a path (hereinafter referred to as a power supplying path) through which the power source circuit 51 supplies the power to the readout IC 16. The power supplying path can be connected to a GND by the discharge circuit. The discharge circuit makes the power supplying path and the GND connected to each other while the power mode of the radiographic image capturing apparatus 1 is set to the sleep mode.

Figure 5A:
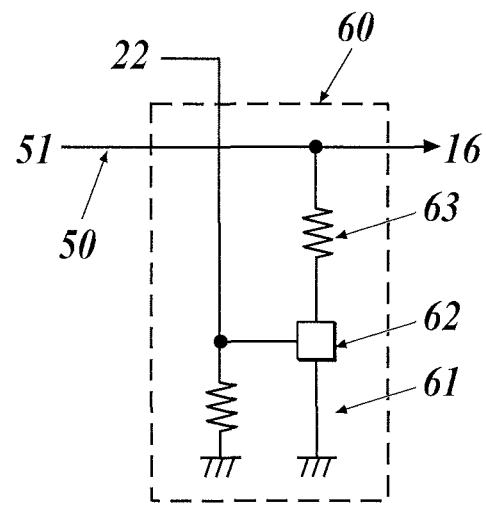
FIG. 5A is a block diagram illustrating a configuration example of a discharge circuit.
Figure 5B:
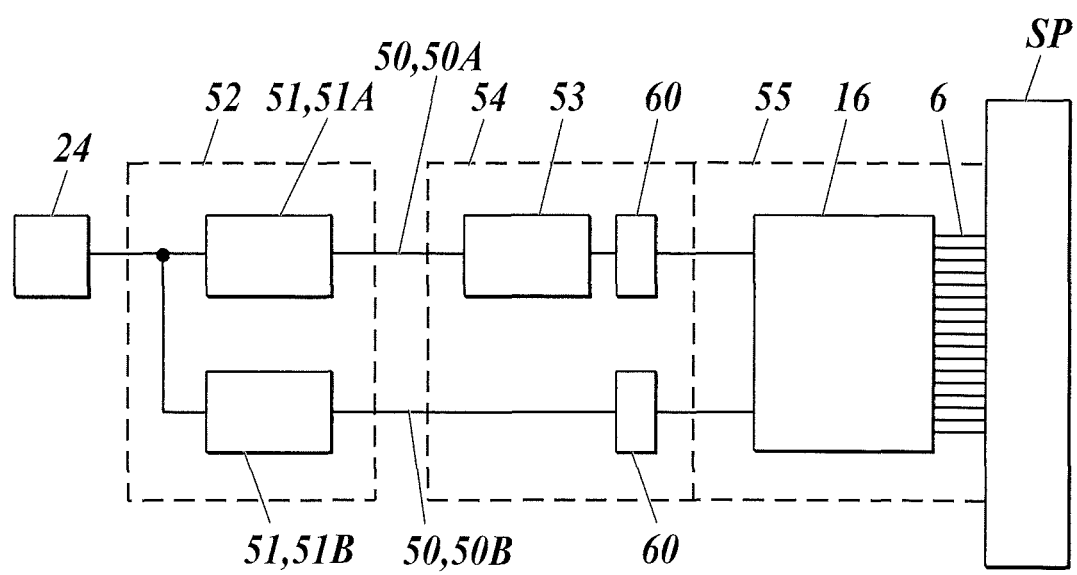
FIG. 5B is a block diagram illustrating a configuration example of a part including the discharge circuit, a power source circuit, etc. of the radiographic image capturing apparatus according to this embodiment.

Hereinafter the configuration including the discharge circuit and the power source circuit 51 will be described in detail. FIG. 5A is a block diagram illustrating a configuration example of the discharge circuit, and FIG. 5B is a block diagram illustrating a configuration example of a part including the discharge circuit, power source circuit, etc. in the radiographic image capturing apparatus of the embodiment. Incidentally, though only the power source circuits 51 and power supplying paths 50 for supplying the power to the readout IC 16 are illustrated in FIG. 5B, it is needless to say that other power source circuits, power supplying paths and the like for supplying the power to other functional sections of the radiographic image capturing apparatus 1, such as the bias power source 14 and the power source circuit 15A of the scan driving member 15, can be arbitrary provided.

As illustrated in FIG. 5A, the discharge circuit 60 of the embodiment is disposed on the power supplying path 50 through which the after-described power source circuit 51 supplies the power to the readout IC 16. On a wiring 61 connecting the power supplying path 50 to the GND in the discharge circuit 60, there is provided a switch element 62 which is composed of, for example, a Field Effect Transistor (FET). The switch element 62 is controlled to be turned on/off by control signals from the control member 22 (see FIG. 3 and the like). Additionally, a resistance 63 is disposed on the wiring 61 which connects the power supplying path 50 to the switch element 62 so that the electric discharges are prevented from flowing into the GND at once when the switch element 62 is turned on.

In the embodiment, as illustrated in FIG. 5B, the power source circuit 51 is disposed on a power source substrate 52. The above-described battery 24 which is composed of, for example, a lithium ion capacitor supplies the power to the power source circuit 51. As the power source circuit 51, there are provided a power source circuit 51A for supplying the power to an analog circuit such as the operation amplifier 18A of the amplifier circuit 18 in the readout IC 16, and a power source circuit 51B for supplying the power to a digital circuit such as the A/D convertor 20 (see FIGS. 3 and 4) in the readout IC 16. In the embodiment, each of the power source circuits 51A, 51B is composed of a DC/DC convertor or the like, and outputs a predetermined voltage value to each of the power supplying paths 50A, 50B.

Additionally, a constant voltage DC power source circuit 53 is disposed on the power supplying path 50A connected to the power source circuit 51A. As the constant voltage DC power source circuit, for example, a Low Drop-Out regulator may be used.

Incidentally, FIG. 4 illustrates only the path through which the power source circuit 51 (i.e. the power source circuit 51A in this case) supplies the power to the operational amplifier 18A of the amplifier circuit 18 in the readout circuit 17, and the illustrations of a path through which the power source circuit 51A supplies the power to other analog circuits in the readout IC 16, a path through which the power source circuit 51B supplies the power to the digital circuits in the readout IC 16 such as the A/D convertor 20, and so on are omitted in FIG. 4. Also the constant voltage DC power source circuit 53, the discharge circuit 60, etc. are omitted in FIG. 4.

In the embodiment, a substrate 54 including the constant voltage DC power source circuit 53 is connected to the sensor substrate 4 (see FIGS. 1 and 2) of the sensor panel SP via a flexible circuit substrate 55. The readout ICs 16 are incorporated on the film of the flexible circuit substrate 55. The required number of the readout ICs 16 are provided correspondingly to the number or the signal lines 6 or the like, as described above.

In the embodiment, the discharge circuit 60 illustrated in FIG. 5A is disposed on the power supplying path 50A connecting the constant voltage DC power source circuit 53 and the readout IC 16 to each other. The discharge circuit 60 is disposed also on the power supplying path 50B connecting the power source circuit 51B for supplying the power to the digital circuit and the readout IC 16 to each other.

Incidentally, though FIG. 5B illustrates the case that the discharge circuit 60 on the power supplying path 50B is disposed on the substrate 54, the discharge circuit 60 can also be disposed on the power source substrate 52 (i.e. in the vicinity of the power source circuit 51B). The discharge circuits 60 are thus disposed on the appropriate positions on the power supplying paths 50A, 50B.

[Operations]

Next, the operations of the radiographic image capturing apparatus 1 of the embodiment will be described.

When the imaging is performed by the radiographic image capturing apparatus 1 while the power mode of the radiographic image capturing apparatus 1 is set to the imagable mode, if the power supplying path 50 is connected to the GND, the power, which is to be supplied to the readout IC 16 from the power source circuit 51, would be released to the GND. As a result, the readout IC 16 cannot accurately function, the image data D cannot be read out from the radiation detecting elements 7, and the imaging cannot be accurately performed.

For this reason, the discharge circuit 60 does not connect the power supplying path 50 to the GND when the power mode of the radiographic image capturing apparatus 1 is set to the imagable mode. Concretely, the control member 22 controls the switch element 62 (see FIG. 5A) of the discharge circuit 60 so that it becomes off-state in the imagable mode.

The control member 22 switches the power mode of the radiographic image capturing apparatus 1 from the imagable mode to the sleep mode at the appropriate timing, such as the timing when the imaging is completed, and the timing when non-imaging state continues for a predetermined time. At that time, the control member 22 executes the control so that the switch element 62 of the discharge circuit 60 is turned on, and thereby the power supplying path 50 is connected to the GND.

When the discharge circuit 60 connects the power supplying path 50 to the GND, the electric charges remaining on the side of the power source circuit 51 (see FIG. 5B) flow into the discharge circuit 60 from the power supplying path 50, and flow out toward the GND through the switch element 62. The electric charges remaining on the side of the power source circuit 51 are thus removed, by the discharge circuit 60, from the side of the power source circuit 51 accurately.

Moreover, when the discharge circuit 60 connects the power supplying path 50 to the GND, the electric charges remaining on the side of the readout IC 16 (see FIG. 5B) flow into the discharge circuit 60 from the power supplying path 50, and flow out toward the GND through the switch element 62. The electric charges remaining on the side of the readout IC 16 are thus removed, by the discharge circuit 60, from the side of the readout IC 16 accurately.

In the meantime, the sensor panel SP has the configuration where at least one insulating layer is disposed between adjacent components among the scanning lines 5, signal lines 6, radiation detecting elements 7, TFT 8, bias lines 9, and so on (see FIGS. 2 and 3) and the parasitic capacitances are formed in various portions. For this reason, even when the power mode of the radiographic image capturing apparatus 1 is switched to the sleep mode, the electric charges are trapped in the portions of the parasitic capacitances and remain therein, and cannot always be removed easily.

However, when the discharge circuit 60 connects the power supplying path 50 to the GND at the time of shift of the power mode from the imagable mode to the sleep mode as the embodiment, the electric charges remaining in the sensor panel SP flow into the readout IC 16 from the sensor panel SP via the signal lines 6 as illustrated in FIG. 5B, and the electric charges, which has flowed into the readout IC 16, flow into the discharge circuit 60 via the power supplying path 50 and flow out toward the GND.

Accordingly, the configuration of the embodiment can accurately remove the electric charges remaining not only in the power source circuit 51 and/or the readout IC 16 but also in the sensor panel SP so that the electric charges flow out toward the GND via the discharge circuit 60 and can be accurately removed.

As described above, because the removal efficiency of the residual electric charges in the sleep mode is different according to each of the readout ICs 16 or each of the readout circuits 17, a conventional radiographic image capturing apparatus reaches the state that a residual amount of the electric charges which have not been removed during the sleep mode is different according to each of the readout ICs 16 or each of the readout circuits 17.

If the power mode is switched from the sleep mode to the imagable mode and then the imaging is performed during the radiographic image capturing apparatus is in the above state, the offset to be superimposed on the image data D, the offset being due to the residual electric charge, would become different according to each of the readout ICs 16 so that the image unevenness appears in the radiographic image I, and/or the offset to be superimposed on the image data D, the offset being due to the residual electric charge, would become different according to each of the readout circuits 17 so that the stripe pattern appears in the radiographic image I (see FIG. 7).

On the contrary, the radiographic image capturing apparatus 1 of the embodiment has the configuration where the discharge circuits 60 are provided on the power supplying paths 50, and the discharge circuit 60 connects the power supplying path 50 to the GND while the power mode of the radiographic image capturing apparatus 1 is set to the sleep mode so that the electric charges remaining in the power source circuit 51, readout IC 16, sensor panel SP, and so on are proactively removed toward the GND.

According to the configuration, even when the removal efficiency of the residual electric charges in the sleep mode is different according to each of the readout ICs 16 or each of the readout circuits 17, the discharge circuit 60 proactively makes the residual electric charges flow out toward the GND, and thereby the electric charges are removed from the apparatus. Accordingly, the radiographic image capturing apparatus 1 can maintain the state that the electric charges hardly remain in the power source circuit 51, readout IC 16, sensor panel SP, and so on while the sleep mode is continued.

After that, when the power mode is switched from the sleep mode to the imagable mode and then the imaging is performed, the offsets due to the residual electric charges are not superimposed (or are hardly superimposed) on the image data D. Accordingly, the radiographic image I generated based on the read-out image data D does not include the image unevenness caused by a difference in the removal efficiency of the residual electric charges according to each of the readout ICs 16, or the stripe pattern caused by a difference in the removal efficiency of the residual electric charges according to each of the readout circuits 17.

[Effects]

As described above, according to the radiographic image capturing apparatus 1 of the embodiment, the discharge circuits 60 capable of connecting the power supplying path 50 and the GND to each other are disposed on the power supplying paths 50 through which the power source circuits 51 supply the power to the readout IC 16, and the discharge circuit 60 connects the power supplying path 50 and the GND to each other while the power mode of the radiographic image capturing apparatus 1 is set to the sleep mode.

Thus, the electric charges remaining in the power source circuit 51, readout IC 16 and sensor panel SP can be accurately removed because the discharge circuit 60 proactively makes the electric charges flow out toward the GND during the sleep mode. Even when the power mode is switched from the sleep mode to the imagable mode and the imaging is performed after that, the offsets due to the residual electric charges can be accurately prevented from being superimposed on the image data D, and the image unevenness and/or stripe pattern can be prevented from appearing in the radiographic image I generated based on the read-out image data D.

Incidentally, according to the research of the inventor, it has been confirmed that the radiographic image I includes no image unevenness or stripe pattern, or at least the image unevenness and/or stripe pattern cannot be visually confirmed in the radiographic image I, when the radiographic image capturing apparatus 1 is actually configured to have the configuration of the embodiment.

[Others Such as Variations]

The configuration of the part including the discharge circuit 60, power source circuit 51, etc. of the radiographic image capturing apparatus 1 illustrated in FIG. 5B is a mere example, and it is needless to say that other necessary configurations such as a low pass filter can be arbitrary provided.

In the above embodiment, there is described the case that the control member 22 transmits the control signals to the switch element 62 (see FIG. 5A) of the discharge circuit 60 so as to turn on/off the switch element 62, when the power mode of the radiographic image capturing apparatus 1 is switched to the sleep mode or the imagable mode, so that the discharge circuit 60 connects the power supplying path 50 and the GND to each other and/or cuts the connection theirbetween.

Alternatively, for example, the configuration where the discharge circuit 60 itself switches on/off of the switch element 62, on the basis of the signals for switching the power mode to the sleep or imagable mode transmitted from the control member, 22 so as to connect the power supplying path 50 and the GND to each other or cut the connection theirbetween, may be adopted.

Some radiographic image capturing apparatuses 1 are configured so that the power is not supplied also to the control member 22 in the sleep mode. In such a case, for example, a configuration where the switch element 62 of the discharge circuit 60 is automatically turned on/off in accordance with the stop (in the case of the sleep mode) or the activation (in the case of the imagable mode) of the control member 22 may be adopted, instead of controlling the on/off of the switch element 62 of the discharge circuit 60 by the control section 22 as described above.

[Variation 1]

As described above, according to the configuration where the discharge circuits 60 are disposed on the power supplying paths 50 through which the power source circuits 51 supply the power to the readout IC 16, and where the discharge circuit 60 connects the power supplying path 50 to the GND during the sleep mode, the electric charges remaining in the power source circuit 51, readout IC 16, sensor panel SP, and so on are removed.

Additionally, in order to remove the electric charges remaining in the sensor panel SP more accurately, it is possible to adopt a configuration where the bias power source 14 (see FIGS. 3 and 4) applies the reverse bias voltages to each of the radiation detecting elements 7 via each of the bias lines 9 also in the sleep mode. According to the configuration, the electric charges remaining in the radiation detecting elements 7 can flow out toward the side of the bias power source 14 via the bias lines 9 in the sleep mode, and thereby the electric charges can be accurately removed from the radiation detecting elements 7.

[Variation 1-1]

In this regard, it is possible to adopt a configuration where the bias power source 14 continues to apply the reverse bias voltage to the radiation detecting elements 7 during the sleep mode. According to the configuration, the reverse bias voltage can be continuously applied from the bias power source 14 to the radiation detecting elements 7 during the sleep mode. Therefore, the electric charges remaining in the radiation detecting elements 7 can flow out toward the side of the bias power source 14 so as to be accurately removed from the radiation detecting elements 7.

[Variation 1-2]

It is also possible to adopt a configuration where the bias power source 14 applies the reverse bias voltage Vbias to each of the radiation detecting elements 7 only for a predetermined time Δt every time the voltage V applied from the bias power source 14 to each of the radiation detecting elements 7 rises and reaches a set threshold Vth.

Figure 6:
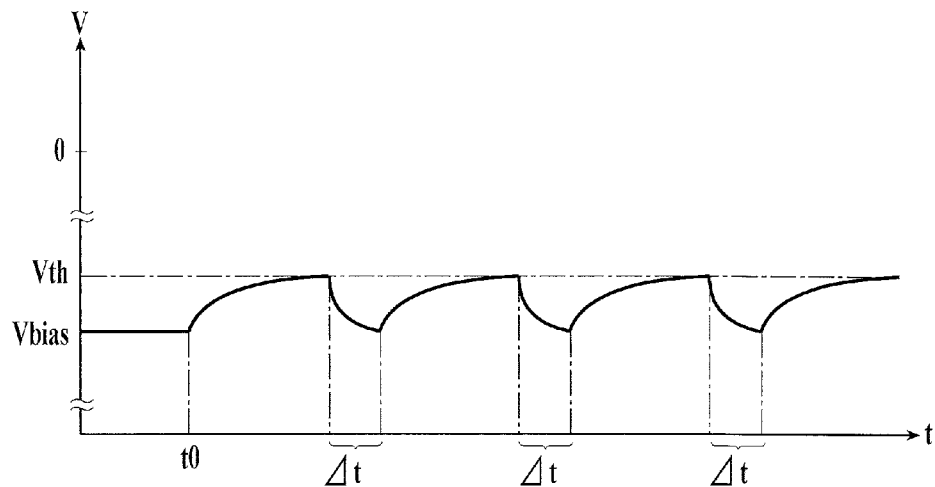
FIG. 6 is a graph illustrating a time shift of a voltage applied to each radiation detecting element in the case of Variation 1-2.

In this case, for example, if the power mode of the radiographic image capturing apparatus 1 is switched from the imagable mode to the sleep mode at time t0 as illustrated in FIG. 6, the voltage V applied from the bias power source 14 to each of the radiation detecting elements 7 gradually rises from the reverse bias voltage Vbias. When the voltage V reaches the threshold Vth, the bias power source 14 applies the reverse bias voltage Vbias, which has been set to a voltage value lower than the threshold Vth, to each of the radiation detecting elements 7 only for the predetermined time Δt. Thus, the voltage V applied from the bias power source 14 to each of the radiation detecting elements 7 rises and falls between the reverse bias voltage Vbias and the threshold Vth.

According to such a configuration, the voltage V applied from the bias power source 14 to each of the radiation detecting elements 7 becomes the low voltage value within the range from the reverse bias voltage Vbias to the threshold Vth during the sleep mode, and thereby it becomes possible to continuously apply the voltage having such a low voltage value to each of the radiation detecting elements 7 during the sleep mode. Therefore, the electric charges remaining in the radiation detecting elements 7 can flow out toward the side of the bias power source 14 so as to be accurately removed from the radiation detecting elements 7. Moreover, compared with the case of continuously applying the reverse bias voltage as Variation 1-1, electric power consumption can be further reduced.

[Variation 1-3]

Incidentally, it is also possible to adopt a configuration where the bias power source 14 applies the reverse bias voltage Vbias to each of the radiation detecting elements 7 only for the predetermined time Δt, at every predetermined time ΔT during the sleep mode, regardless of the voltage V applied from the bias power source 14 to each of the radiation detecting elements 7, instead of applying the reverse bias voltage Vbias from the bias power source 14 to each of the radiation detecting elements 7 only for the predetermined time Δt every time the voltage V applied from the bias power source 14 to each of the radiation detecting elements 7 reaches the set threshold Vth during the sleep mode as Variation 1-2. In this case, the predetermined time ΔT is set to a time according to which the voltage V applied from the bias power source 14 to each of the radiation detecting elements 7 does not become equal to or more than the threshold Vth.

According to such a configuration, the voltage V applied from the bias power source 14 to each of the radiation detecting elements 7 can be suppressed to be the low voltage value during the sleep mode, and thereby the electric charges remaining in the radiation detecting elements 7 can flow out toward the side of the bias power source 14 so as to be accurately removed from the radiation detecting elements 7. Moreover, the reverse bias voltage Vbias only have to be applied from the bias power source 14 to each of the radiation detecting elements 7 only for the predetermined time Δt every time the predetermined time ΔT has passed during the sleep mode, the processing can be easily performed. Furthermore, compared with the case of continuously applying the reverse bias voltage Vbias as Variation 1-1, electric power consumption can be further reduced.

[Variation 2]

Alternatively, in order to more proactively remove the residual electric charges from the radiation detecting elements 7 during the sleep mode, for example, it is also possible to adopt a configuration where the gate driver 15B (see FIG. 3) of the scan driving member 15 sequentially or simultaneously applies ON voltages to lines L1 to Lx of the scanning lines 5 during the sleep mode so that the electric charges are removed from the radiation detecting elements 7.

Similarly to the case of the readout IC 16 illustrated in FIG. 5B, the battery 24 supplies the power also to the power source circuit 15A of the scan driving member 15 as illustrated in FIG. 3. When the power mode of the radiographic image capturing apparatus 1 is set to the imagable mode, the power source circuit 15A supplies the ON and OFF voltages to the gate driver 15B, and the gate driver 15B switches the power to be applied to each of lines L1 to Lx of the scanning lines 5 between the ON and OFF voltages. Thus, the ON or OFF voltage is applied to each of lines L1 to Lx of the scanning lines 5.

Because the supply of the power from the battery 24 to the power source circuit 15A of the san driving member 15 is stopped in the sleep mode, the voltage applied from the gate driver 15B to each of lines L1 to Lx of the scanning lines 5 is in a floating state. The TFTs 8 do not completely become off-state because the gate driver 15B does not apply at least the OFF voltage to the scanning lines 5 in the sleep mode. Accordingly, the electric charges can outflow toward the side of the signal lines 6 or the side of the bias lines 9 via the TFTs 8 in the above-described state. However, the residual electric charges can be removed from the radiation detecting elements 7 during the sleep mode by the configurations of the above embodiments and Variations.

By proactively performing the removing process of the electric charges from the radiation detecting elements 7 during the sleep mode, the residual electric charges can be more accurately removed from the radiation detecting elements 7. Moreover, according to such a configuration, by more accurately removing the electric charges remaining in the radiation detecting elements 7, the image unevenness and/or stripe pattern caused by the offsets due to the residual electric charges can be prevented from appearing in the radiographic image I.

Incidentally, it is indisputable that the present invention is not limited to the above embodiments and variations, and can be arbitrary changed without departing from the spirit of the present invention.

The present U.S. patent application claims a priority under the Paris Convention of Japanese patent application No. 2014-105793 filed on May 22, 2014, in which all contents of this application are disclosed, and which shall be a basis of correction of an incorrect translation.

What is claimed is:

1. A radiographic image capturing apparatus comprising:
   a plurality of radiation detecting elements arranged two-dimensionally;
   a plurality of signal lines each connected to each of the radiation detecting elements;
   a readout IC equipped with a plurality of readout circuits connected to the signal lines, respectively;
   a power source circuit which supplies a power to the readout IC; and
   a discharge circuit disposed on a path through which the power source circuit supplies the power to the readout IC, the discharge circuit being capable of connecting the path and a GND to each other, wherein
   the radiographic image capturing apparatus is configured so that an imaging mode can be switched at least between a wake up mode in which the power is supplied to at least one functional section so that an imaging can be performed, and a sleep mode in which the power is supplied to a required minimum functional section of the functional section and the imaging cannot be performed, and
   the discharge circuit connects the path and the GND to each other during the sleep mode.

2. The radiographic image capturing apparatus of claim 1 further comprising:
   a bias power source which applies a reverse bias voltage to the radiation detecting elements, wherein
   the bias power source applies the reverse bias voltage to the radiation detecting elements in the sleep mode.

3. The radiographic image capturing apparatus of claim 2, wherein the bias power source continuously applies the reverse bias voltage to the radiation detecting elements during the sleep mode.

4. The radiographic image capturing apparatus of claim 2, wherein the bias power source applies the reverse bias voltage to the radiation detecting elements only for a predetermined time every time the voltage applied from the bias power source to the radiation detecting elements rises and reaches a set threshold.

5. The radiographic image capturing apparatus of claim 1 further comprising:
   a plurality of scanning lines;
   a scan driving member which switches a voltage applied to each of the scanning lines between an ON voltage and an OFF voltage; and
   a switch element connected to each of the scanning lines, the switch element causing an electric charge accumulated in each of the radiation detecting elements to be discharged to each of the signal lines when the ON voltage is applied to the switch element via the each of the scanning lines, wherein
   the radiographic image capturing apparatus performs processing to cause the scan driving member to sequentially or simultaneously apply the ON voltage to each of the scanning lines during the sleep mode, so that the electric charge is removed from each of the radiation detecting elements.

* * * * *